(12) United States Patent
Bolshinsky et al.

(10) Patent No.: US 9,843,546 B2
(45) Date of Patent: Dec. 12, 2017

(54) ACCESS PREDICTIONS FOR DETERMINING WHETHER TO SHARE CONTENT

(71) Applicant: International Business Machines Corporation, Armonk, NY (US)

(72) Inventors: Leonid Bolshinsky, Karmiel (IL); Vladimir Gamaley, Rehovot (IL); Sharon Krisher, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 14/807,518

(22) Filed: Jul. 23, 2015

(65) Prior Publication Data
US 2017/0026323 A1 Jan. 26, 2017

(51) Int. Cl.
G06F 15/16 (2006.01)
H04L 12/58 (2006.01)
G06Q 10/10 (2012.01)
G06Q 50/00 (2012.01)

(52) U.S. Cl.
CPC .......... *H04L 51/10* (2013.01); *G06Q 10/101* (2013.01); *G06Q 50/01* (2013.01)

(58) Field of Classification Search
CPC ... H04L 43/045; H04L 51/10; G06F 17/3053; G06F 17/30958
See application file for complete search history.

(56) References Cited

U.S. PATENT DOCUMENTS

| | | | |
|---|---|---|---|
| 8,332,423 B2 | 12/2012 | Xia | |
| 8,589,502 B2 | 11/2013 | O'Sullivan et al. | |
| 8,667,152 B2 | 3/2014 | Capuozzo et al. | |
| 8,768,844 B2 | 7/2014 | Gauba et al. | |
| 2008/0235353 A1 | 9/2008 | Cheever et al. | |
| 2009/0100109 A1 | 4/2009 | Turski et al. | |
| 2011/0055935 A1 | 3/2011 | Karaoguz et al. | |
| 2011/0321132 A1 | 12/2011 | Slingerland et al. | |
| 2012/0284345 A1 | 11/2012 | Costenaro et al. | |
| 2012/0317288 A1 | 12/2012 | Campana et al. | |
| 2013/0117364 A1* | 5/2013 | Bania | G06Q 30/02 709/204 |
| 2013/0159123 A1* | 6/2013 | Hochberg | G06Q 30/06 705/26.1 |
| 2014/0207912 A1* | 7/2014 | Thibeault | H04L 67/2847 709/219 |
| 2014/0282901 A1 | 9/2014 | Dwan et al. | |

* cited by examiner

*Primary Examiner* — Glenford Madamba
(74) *Attorney, Agent, or Firm* — Aaron N. Pontikos; Lance I. Hochhauser

(57) ABSTRACT

Some users (also called sharers) desire to share content with recipients (also called recipients) over a virtual community or other computerized means. Some of the content to be shared (first-order content) may include links, hyperlinks, or other references (links) to additional content (each individually a second-order content). These content layers may continue indefinitely and the content layers may contain links both within and without the domain or virtual community of the first-order content. A sharer may be unaware of whether various recipients have access to any of the various layers of content (first-order or otherwise). Embodiments of the present invention transmit the likelihood for individual recipients to access various layers of content to the sharer.

17 Claims, 2 Drawing Sheets

ACCESS PREDICTIONS FOR DETERMINING WHETHER TO SHARE CONTENT

BACKGROUND OF THE INVENTION

The present invention relates generally to the field of multicomputer data transferring, and more particularly to processing user data in response to a demand to transfer data between the computers.

Individuals are increasingly sharing content through electronic means. Individuals are sharing a growing portion of this content as links (e.g., hyperlinks or web addresses). Individuals can share a link in a variety of fashions, e.g., an email, a private message, a post, a blog, etc. A link may direct a recipient to a web page, an event listing, or a file. Additionally, one individual (a sharer or user) may share a single link with multiple recipients (also called recipients). Individuals share some links within a single virtual community (also called a virtual network or a social network, e.g., Facebook®, Google+®, and Twitter®). ("Facebook," "Google+," and "Twitter" are trademarks of Facebook, Inc., Google, Inc., and Twitter, Inc. respectively.)

A sharer may not be aware whether a recipient has access to the content being shared. If a recipient does not have access to the content being shared, the recipient may encounter an access denial message. Some recipients may have access to the content being shared (first-order content), but do not have access to second-order (or third-, fourth-, etc., order) content. A recipient accesses the different orders of content by links within the content. These different orders of content can be thought of as layers. Specifically, a link within a content leads to additional contents. Each content can be thought of as a layer (or node), and the links between the various contents can be thought of as connections between the layers, creating a hierarchy. Submitting individual requests for the content owner to grant access for each recipient may require significant time and effort.

SUMMARY

Embodiments of the present invention disclose a method, a computer program product, and a system for predicting whether a recipient has access to or will access content, allowing the user to determine whether to share the content with the recipient. The method may include one or more computer processors receiving a request to share a set of content with a set of recipients. The one or more computer processors determine a set of recipient accesses describing a likelihood that each recipient can access the set of content. The one or more computer processors determine a set of prediction scores describing a likelihood that each recipient will access the set of content. The one or more computer processors submit a set of access requests to a set of content owners based on the set of recipient accesses and the set of prediction scores.

DETAILED DESCRIPTION

Some users (also called sharers) desire to share content with recipients (also called contacts) over a virtual community or other computerized means. Some of the content to be shared (first-order content) may include links, hyperlinks, or other references (links) to additional content (each individually a second-order content). These content layers may continue indefinitely, and the content layers may contain links both within and without the domain or virtual community of the first-order content. A sharer may be unaware of whether various recipients have access to any of the various layers of content (first-order or otherwise). Embodiments of the present invention transmit the likelihood for individual recipients to access various layers of content to the sharer.

Figure 1:
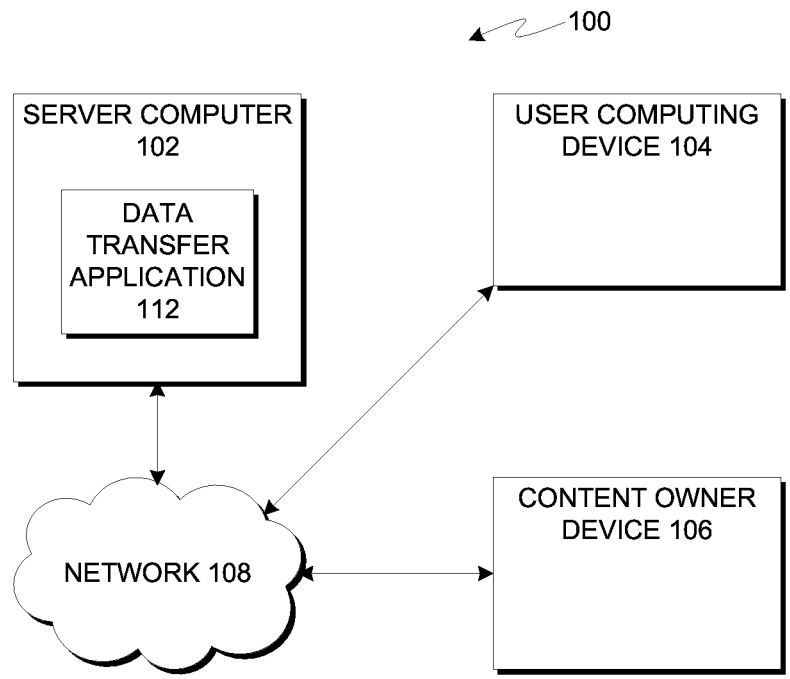
FIG. 1 is a functional block diagram illustrating a data transfer environment, in accordance with an embodiment of the present invention.

The present invention will now be described in detail with reference to the Figures. FIG. 1 is a functional block diagram illustrating a data transfer environment, generally designated 100, in accordance with one embodiment of the present invention. FIG. 1 provides only an illustration of one implementation and does not imply any limitations with regard to the environments in which various embodiments may be made by those skilled in the art without departing from the scope of the invention as recited by the claims.

Data transfer environment 100 includes server computer 102, user computing device 104, and content owner device 106, all interconnected over network 108. Network 108 can be, for example, a telecommunications network, a local area network (LAN), a wide area network (WAN), such as the Internet, or a combination of the three, and can include wired, wireless, or fiber optic connections. Network 108 can include one or more wired and/or wireless networks that are capable of receiving and transmitting data, voice, and/or video signals, including multimedia signals that include voice, data, and video information. In general, network 108 can be any combination of connections and protocols that will support communications among server computer 102, user computing device 104, content owner device 106, and other computing devices (not shown) within data transfer environment 100.

Server computer 102, user computing device 104, and content owner device 106 can each be a laptop computer, a tablet computer, a smart phone, other mobile computing device, wearable computing device, or any programmable electronic device capable of communicating with various components and devices within data transfer environment 100, via network 108. In general, server computer 102, user computing device 104, and content owner device 106 each represent any programmable electronic device or combination of programmable electronic devices capable of executing machine readable program instructions and communicating with other computing devices (not shown) within data transfer environment 100 via a network, such as network 108. Server computer 102 is any device capable of: receiving a request to share content; determining a recipient access (a likelihood that a recipient has the ability to access the content); determining a prediction score (a likelihood that a recipient will access the content); transmitting the recipient access and the prediction score to the user; and/or submitting an access request to a content owner. A "set of" items, as used throughout this Specification, means there exists one or more items; there must exist at least one item, but there can also be two, three, or more items. A "subset of" items, as used throughout this Specification, means there exists one or more items within a grouping of items that contain a common characteristic. A "plurality of" items, as used throughout this Specification, means there exists more than one item; there must exist at least two items, but there can also be three, four, or more items. User computing device 104 is any device on which a user is able to share a set of content with a device operated by a recipient (not shown). Content owner device 106 is any device capable of processing a request from the user to share content with a set of recipients. Server computer 102 includes data transfer application 112. Data transfer application 112 is any application loaded on server computer 102 capable of performing the tasks required of server computer 102.

Figure 2:
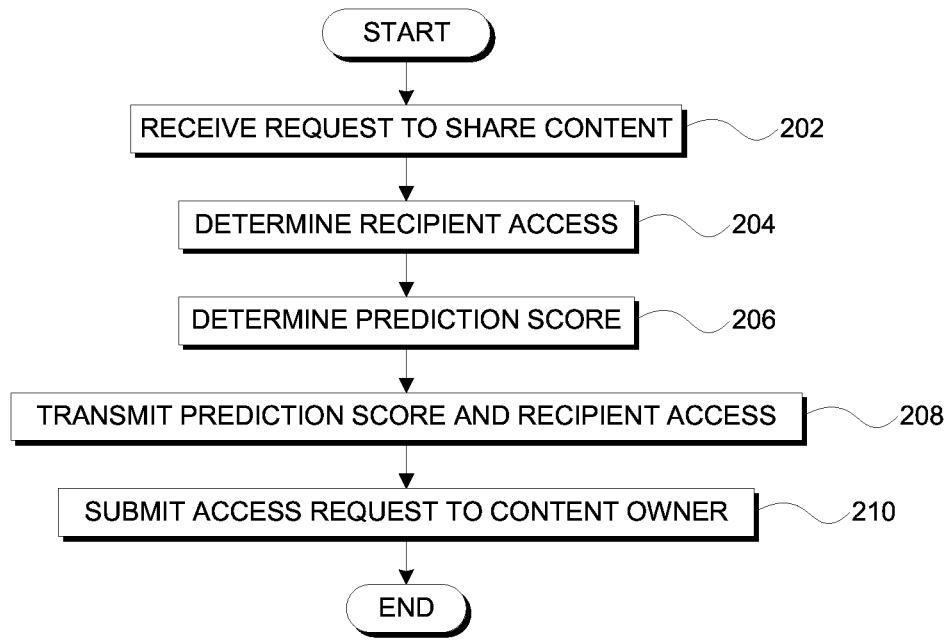
FIG. 2 is a flowchart depicting operational steps of a data transfer module, for sharing content, in accordance with an embodiment of the present invention.

FIG. 2 is a flowchart depicting operational steps of data transfer application 112, for sharing content, in accordance with an embodiment of the present invention. An example is used throughout the discussion of FIG. 2 wherein a user, John, shares a first blog post on a first virtual community with three friends, Ann, Bob, and Carl. The blog post contains two links; the first link is to a second blog post on the same virtual community, the second link is to a video on a second virtual community. David wrote the two blog posts; John created the video.

Data transfer application 112 receives a request to share content (step 202). In the example, data transfer application 112 has received John's request to share the first blog post with Ann, Bob, and Carl. In some embodiments, data transfer application 112 determines the set of content. In the example, data transfer application 112 identifies the first blog post and, through the links, the second blog post and the video. In some embodiments, the set of content includes a plurality of content layers. In some embodiments, data transfer application 112 bases a content layer on a number of links required to reach that piece of content. In some embodiments, a first-order content is the initial content layer. In some embodiments, a second-order content, third-order content, etc., is a second content layer, third content layer, etc., respectively. In the example, the first blog post is the first-order content and the second blog post and the video are each a second-order content.

In some embodiments, data transfer application 112 includes determining the set of recipients. In some embodiments, a user shares the set of content with a set of recipients over multiple virtual communities. In some embodiments, data transfer application 112 determines and removes duplicate recipients in the set of recipients. In this example, Ann has an account on the first virtual community containing the blog post, so John's request included that account, but John also included an account for each of Ann, Bob, and Carl on a third virtual community. Data transfer application 112 determines that Ann's two accounts are duplicates and only performs further actions for one account. In some embodiments, data transfer application 112 performs further actions for both accounts. In some embodiments, data transfer application 112 is unaware that duplicate accounts belong to the same recipient.

Data transfer application 112 determines a recipient access (step 204). A recipient access is a likelihood that a recipient has the ability to access the content. In some embodiments, the user is unaware of a set of access rules for the set of content. Alternatively, the user is unaware of the varying levels of access to the set of content for each recipient in the set of recipients. In this example, John does not know the set of access rules to the first blog post, nor does John know whether Ann, Bob, and Carl have such access. Various recipients in the set of recipients have access to the set of content. In this example, Ann's account on the first virtual community has access to the blog posts, but the accounts for Bob and Carl do not have access to those blog posts. None of the accounts has access to John's video. However, data transfer application 112 may be unaware of whether a recipient in the set of recipients has access to the set of content. Alternatively, server computer 102 contains a repository (not shown) in which is stored the content and a set of access rights to the content for each of the recipients and data transfer application 112 is aware of whether a recipient in the set of recipients has access to the set of content.

In some embodiments, data transfer application 112 bases a recipient access for a recipient on a set of publically available information about the recipient. In some embodiments, data transfer application 112 bases a recipient access for a recipient on a social graph. A social graph is a visual representation of connections on a virtual community, in which nodes represent individuals and connected nodes represent relationships between individuals. In some embodiments, a recipient access and a distance in a social graph have an inverse relationship (i.e., the more distance between the recipient and the user, the less likely the recipient will have access to the content). In some embodiments, a recipient access is a numerical value. In some embodiments, a recipient access is a probability. In some embodiments, a recipient access is a percentage. In some embodiments, a recipient access is a score on a 100-point scale. In some embodiments, data transfer application 112 describes a recipient access in language, such as, for example: "certainly will not"; "might"; "likely will"; and/or "certainly will." In this example, data transfer application 112 determines an 80% likelihood that Ann's account on the first virtual community has access to the first blog post. Data transfer application 112 determines this percentage based on general rules of the first virtual community giving access to content for accounts within two degrees of separation, the number of accounts on the first virtual community, and the likelihood of Ann having a virtual network connection with David. Data transfer application 112 also determines a 50% likelihood that the accounts on the third virtual community (Bob's account, Carl's account, and Ann's other account) have access to the first blog post. Data transfer application 112 determines these percentages based on a probability that accounts on the third virtual community will have counterpart accounts on the first virtual community, a probability that accounts on the first virtual community and the third virtual community are linked, and the rules of the first virtual community and the third virtual community.

In some embodiments, data transfer application 112 analyzes a number of layers of the set of content to determine a recipient access. In some embodiments, data transfer application 112 determines the number of layers of the set of content to analyze based, at least in part, on one of: an input by a user; a preset; two layers; and/or a variable dependent on the source of the set of content. In some embodiments, a recipient access relates only to the first-order content (also sometimes called a first layer content or direct content). In some embodiments, data transfer application 112 determines a recipient access as a combination score for each layer of content. In this example, data transfer application determines a set of recipient accesses for each of Ann, Bob, and Carl based on two layers of content (the first layer is the first blog post and the second layer is both the second blog post and the video).

In some embodiments, data transfer application 112 determines a recipient access for a recipient based, at least in part, on a set of prior content shared with the recipient. In some embodiments, data transfer application 112 gathers information about the recipient from a variety of virtual communities and/or publically available sources. In some embodiments, data transfer application 112 incorporates information about the recipient in the determination of the recipient access. For example, if Bob did not read previously shared content about sports, data transfer application 112 decreases the recipient access for Bob if the blog posts and video John shares relate to sports.

In some embodiments, data transfer application 112 determines the recipient access based, at least in part, on the topic of the set of content and a set of recipient interests. In some embodiments, data transfer application 112 determines a set of recipient interests based, at least in part, on a set of documents viewed and/or edited by that recipient. In some embodiments, data transfer application 112 determines a recipient access based, at least in part, on how often the recipient reads content shared with him or her by the user. In some embodiments, data transfer application 112 determines a recipient access based, at least in part, on how often the recipient reads content on the same topic as the set of content. In some embodiments, data transfer application 112 determines a recipient access based, at least in part, on a virtual community profile showing contacts or interests. For example, some virtual community profiles shows individuals or accounts that the recipient follows; some virtual community profiles show individuals or accounts that follow the recipient; some virtual community profiles have areas in which the recipient lists favorite items in a category, such as books, music, and television shows.

Data transfer application 112 determines a prediction score (step 206). A prediction score is a likelihood that a recipient will access the content. In some embodiments, determining a prediction score includes predicting for each recipient in the set of recipients the likelihood that the recipient will read the set of content. Various recipients in the set of recipients have varying likelihoods of reading the set of content. In some embodiments, the user is unaware of whether a contact may read the set of content. Alternatively, the user is unaware of whether a contact will read the varying levels of the set of content. In this example, John does not know whether any of Ann, Bob, or Carl will read the first blog post, nor does John know whether any of Ann, Bob, or Carl will read the second blog post or watch the video. Various recipients in the set of recipients will read various amounts of the set of content. In this example, data transfer application 112 determines Ann is more likely to read the first blog post because she has an account on the first virtual community. Data transfer application 112 determines that Carl is less likely to read the first blog post because the post relates to technology and in the past Carl has not read prior content about technology. In some embodiments, data transfer application 112 may be unaware of whether a recipient in the set of recipients has access to the set of content. Alternatively, server computer 102 contains a repository (not shown) in which is stored the content and a set of content previously shared with the recipients and whether that content previously shared was read by the recipients.

In some embodiments, data transfer application 112 bases a prediction score for a recipient on a set of publically available information about the recipient. In some embodiments, data transfer application 112 bases a prediction score for a recipient on a social graph. A social graph is a visual representation of connections on a virtual community, in which nodes represent individuals and connected nodes represent relationships between individuals. In some embodiments, a prediction score and a distance in a social graph have an inverse relationship (i.e., the more distance between the recipient and the user, the less likely the recipient will read the content). In some embodiments, a prediction score is a numerical value. In some embodiments, a prediction score is a probability. In some embodiments, a prediction score is a percentage. In some embodiments, a prediction score is a score on a 100-point scale. In some embodiments, data transfer application 112 describes a prediction score in language, such as, for example: "certainly will not"; "might"; "likely will"; and/or "certainly will." In this example, data transfer application 112 determines a 60% likelihood that Ann will read the content from her account on the first virtual community. Data transfer application 112 bases this determination on Ann having read 80% of previous content shared by John, listing various technology magazines on her account profile, and having read 45% of content including David's blog. Data transfer application 112 determines a 50% likelihood that Bob will read the first blog post and a 20% likelihood that Carl will read the first blog post. Data transfer application 112 bases these determinations, in part, on Bob having to go to the first virtual community to access the content and Carl not having read any prior content about technology.

In some embodiments, data transfer application 112 analyzes a number of layers of the set of content to determine a prediction score. In some embodiments, data transfer application 112 determines the number of layers of the set of content to analyze based, at least in part, on one of: an input by a user; a preset; two layers; and/or a variable dependent on the source of the set of content. In some embodiments, a prediction score relates only to the first-order content (also sometimes called a first layer content or direct content). In some embodiments, data transfer application 112 determines a prediction score as a combination score for each layer of content. In this example, data transfer application determines a set of prediction scores for each of Ann, Bob, and Carl based on two layers of content (the first layer is the first blog post and the second layer is both the second blog post and the video).

In some embodiments, data transfer application 112 determines a prediction score for a recipient based, at least in part, on a set of prior content shared with the recipient. In some embodiments, data transfer application 112 gathers information about the recipient from a variety of virtual communities and/or publically available sources. In some embodiments, data transfer application 112 incorporates information about the recipient in the determination of the prediction score. For example, if Bob did not read previously shared content about sports, data transfer application 112 decreases the prediction score for Bob if the blog posts and video John shares relate to sports.

In some embodiments, data transfer application 112 determines the prediction score based, at least in part, on the topic of the set of content and a set of recipient interests. In some embodiments, data transfer application 112 determines a set of recipient interests based, at least in part, on a set of documents viewed and/or edited by that recipient. In some embodiments, data transfer application 112 determines a prediction score based, at least in part, on how often the recipient reads content shared with him or her by the user. In some embodiments, data transfer application 112 determines a prediction score based, at least in part, on how often the recipient reads content on the same topic as the set of content.

Data transfer application 112 transmits to the user a set of recipient accesses and a set of prediction scores (step 208). In some embodiments, data transfer application 112 transmits to the user a ranked list of the recipients based, at least in part, on the set of recipient access and/or the set of prediction scores. In some embodiments, data transfer application 112 displays the set of content accesses and/or the set of prediction scores in a graphical manner. A graphical manner may be any form of visual or tabular presentation of data. In some embodiments, data transfer application 112 does not transmit a recipient access and/or a prediction score to the user if the recipient access and/or the prediction score are below a threshold level. In some embodiments, data transfer application 112 determines the threshold level as one of, but not limited to an input by a user and/or a preset. In some embodiments, data transfer application 112 omits step 208 and does not transmit the set of prediction scores to the user. In some embodiments, data transfer application 112 presents the user with an ordered table or list of the set of recipient accesses and/or the set of prediction scores. In some embodiments, the ordered table or list of the set of recipient accesses and/or the set of prediction scores is sortable. In some embodiments, data transfer application 112 sorts the ordered table or list of the set of recipient accesses and/or the set of prediction scores by the corresponding recipient name. In this example, data transfer application 112 transmits a list to John indicating the names of the recipients and the percentage representations of the recipient access and the prediction score. The list includes: Ann, 80% recipient access (ra), 60% prediction score (ps); Bob, 50% ra, 50% ps; Carl, 50% ra, 20% ps.

In some embodiments, data transfer application 112 confirms the sharing request with the user. Based upon the recipient access and/or the prediction score for a recipient, the user may not desire to share the set of content with the recipient; transmitting the recipient access and the prediction score to the user allows the user to update the set of recipients for whom the user requests to share the set of content. In some embodiments, the user excludes a recipient from the access request list. In some embodiments, data transfer application 112 excludes a recipient from the access list based, at least in part, on the recipient access and/or the prediction score. In some embodiments, data transfer application 112 automatically determines an outcome based, at least in part, on the recipient access and/or the prediction score. In some embodiments, data transfer application 112 determines an outcome based, at least in part, on a threshold level of one or more of the prediction score, the recipient access, and/or a combination of the prediction score and the recipient access for a recipient. In this example, data transfer application 112 receives confirmation that John wants to share the content with Ann and Bob, but not Carl.

Data transfer application 112 submits an access request to the content owner (step 210). A content owner may also be called a content manager or a content administrator. A content owner may be a person, but may also be a computer or a machine. Generally, a content owner has the authority and/or the ability to grant access to content. In some embodiments, a content owner maintains the authority and/or ability to grant access to a subset of the set of content. Data transfer application 112 may not submit individual requests for access to the set of content for each recipient that requires access. In some embodiments, data transfer application 112 does not submit an access request for at least one recipient. In some embodiments, data transfer application 112 submits an access request to the user for content for which the user is the content owner. In some embodiments, data transfer application 112 includes a justification for an access request.

In some embodiments, data transfer application 112 automatically submits automatic access request on behalf of recipients for whom data transfer application 112 determines are less likely to have access. Alternatively, data transfer application 112 awaits instructions before submitting the access requests. In some embodiments, data transfer application 112 aggregates access requests for each recipient into a single access request. In some embodiments, data transfer application 112 aggregates access requests for each content owner into a single access request.

In some embodiments, data transfer application 112 separates the set of recipients into a set of recipient groups based, at least in part, on the content owner of the subset of the set of content to which the recipient requires access. In some embodiments, the user is the owner of the content. In some embodiments, data transfer application 112 separates the set of recipients into two groups: the user is the only content owner required to grant access; the user is not the only content owner required to grant access. In this example, data transfer application 112 determines that Ann likely has access to the two blog posts written by David, but that Bob does not have access thereto. Data transfer application 112 also determines that neither Ann nor Bob has access to John's video. Therefore, data transfer application 112 submits a request to David to allow Bob access to the blog posts. In some embodiments, data transfer application 112 automatically approves an access request if the user is the content owner. In this example, data transfer application 112 automatically approves an access request to the video on John's behalf for each of Ann and Bob.

Figure 3:
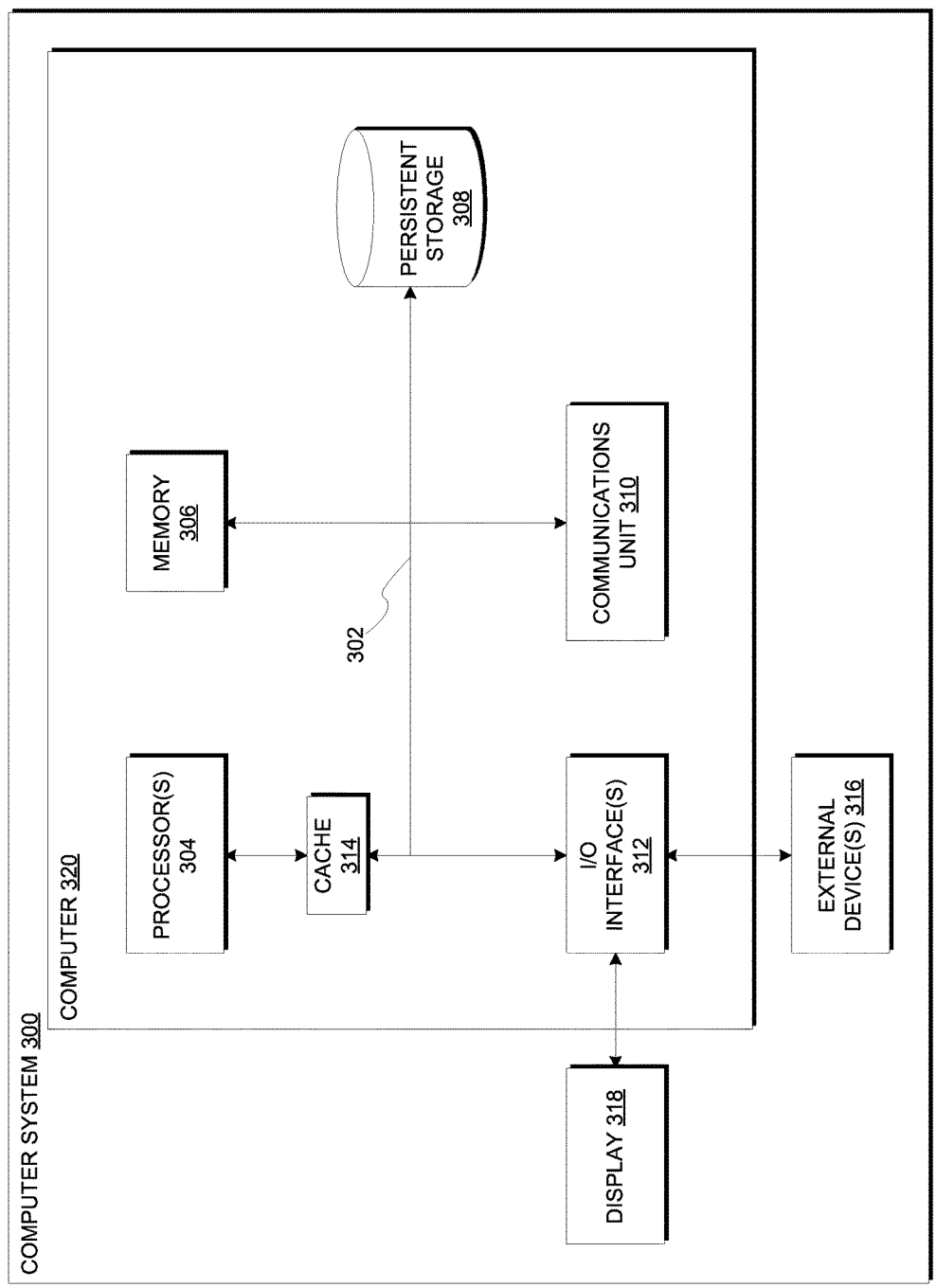
FIG. 3 is a block diagram of components of a data transfer system, such as the server computer of FIG. 1, in accordance with an embodiment of the present invention.

FIG. 3 depicts a block diagram of components of a computer system 300, which is an example of a system such as server computer 102 of FIG. 1, in accordance with an illustrative embodiment of the present invention. It should be appreciated that FIG. 3 provides only an illustration of one implementation and does not imply any limitations with regard to the environments in which various embodiments may be implemented. Many modifications to the depicted environment may be made.

Computer system 300 includes computer 320. Computer 320 includes computer processors(s) 304, cache 314, memory 306, persistent storage 308, communications unit 310, input/output (I/O) interface(s) 312, and communications fabric 302. Communications fabric 302 provides communications between cache 314, memory 306, persistent storage 308, communications unit 310, and I/O interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a memory that enhances the performance of processor(s) 304 by storing recently accessed data, and data near recently accessed data, from memory 306.

Program instructions and data used to practice embodiments of the present invention, e.g., data transfer application 112 can be stored in persistent storage 308 for execution and/or access by one or more of the respective processor(s) 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including with user computing device 104 and content owner device 106. In these examples, communications unit 310 includes one or more network interface cards. Communications unit 310 may provide communications through the use of either or both physical and wireless communications links. Data transfer application 112 may be downloaded to persistent storage 308 through communications unit 310.

I/O interface(s) 312 allows for input and output of data with other devices that may be connected to computer 320. For example, I/O interface(s) 312 may provide a connection to external device(s) 316 such as a keyboard, a keypad, a touch screen, and/or some other suitable input device. External device(s) 316 can also include portable computer readable storage media such as, for example, thumb drives, portable optical or magnetic disks, and memory cards. Software and data used to practice embodiments of the present invention, e.g., data transfer application 112, can be stored on such portable computer readable storage media and can be loaded onto persistent storage 308 via I/O interface(s) 312. I/O interface(s) 312 also connect to a display 318. Display 318 provides a mechanism to display data to a user and may be, for example, a computer monitor or an incorporated display screen, such as is used, for example, in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    receiving, by one or more computer processors, a request to share a set of content with a set of recipients;
    determining, by the one or more computer processors, a set of recipient accesses, wherein a recipient access in the set of recipient accesses corresponds to a recipient in the set of recipients and wherein each recipient access in the set of recipient accesses describes a likelihood that a corresponding recipient in the set of recipients can access the set of content;
    determining, by the one or more computer processors, a set of prediction scores, wherein a prediction score in the set of prediction scores corresponds to a recipient in the set of recipients and wherein each prediction score in the set of prediction scores describes a likelihood that a corresponding recipient in the set of recipients will access the set of content;
    determining, by the one or more computer processors, that one or more access requests are required for a subset of the set of recipients to access at least a first content in the set of content based, at least in part, on the set of recipient accesses and the set of prediction scores; and
    submitting, by the one or more computer processors, prior to sharing the set of content with the set of recipients, the one or more access requests for the subset of the set of recipients to a set of content owners, wherein a content owner in the set of content owners corresponds to a content in the set of content.

2. The method of claim 1, further comprising:
    transmitting, by the one or more computer processors, the set of recipient accesses and the set of prediction scores to a user.

3. The method of claim 2, wherein the set of prediction scores is transmitted in a graphical manner.

4. The method of claim 3, wherein the set of prediction scores presented in the graphical manner is ranked based on the likelihood that the set of recipients will read the set of content.

5. The method of claim 1, wherein the set of content exists on a virtual community.

6. The method of claim 1, wherein the set of prediction scores is based, at least in part, on a social graph.

7. The method of claim 1, wherein:
    the set of content includes at least a first layer and a second layer; and
    the second layer is accessed by a link contained in the first layer.

8. A computer program product comprising:
    one or more computer readable storage device; and
    program instructions stored on the one or more computer readable storage device, the program instructions comprising:
        program instructions to receive a request to share a set of content with a set of recipients;
        program instructions to determine a set of recipient accesses, wherein a recipient access in the set of recipient accesses corresponds to a recipient in the set of recipients and wherein each recipient access in the set of recipient accesses describes a likelihood that a corresponding recipient in the set of recipients can access the set of content;
        program instructions to determine a set of prediction scores, wherein a prediction score in the set of prediction scores corresponds to a recipient in the set of recipients and wherein each prediction score in the set of prediction scores describes a likelihood that a corresponding recipient in the set of recipients will access the set of content;
        program instructions to determine that one or more access requests are required for a subset of the set of recipients to access at least a first content in the set of content based, at least in part, on the set of recipient accesses and the set of prediction scores; and program instructions to submit, prior to sharing the set of content with the set of recipients, the one or more access requests for the subset of the set of recipients to a set of content owners, wherein a content owner in the set of content owners corresponds to a content in the set of content.

9. The computer program product of claim 8, further comprising:

program instructions to transmit the set of recipient accesses and the set of prediction scores to a user.

10. The computer program product of claim 9, wherein the set of prediction scores is transmitted in a graphical manner.

11. The computer program product of claim 8, wherein the set of content exists on a virtual community.

12. The computer program product of claim 8, wherein the set of prediction scores is based, at least in part, on a social graph.

13. A computer system comprising:

one or more computer processors;

one or more computer readable storage device; and program instructions stored on the one or more computer readable storage device for execution by at least one of the one or more computer processors, the program instructions comprising:

program instructions to receive a request to share a set of content with a set of recipients;

program instructions to determine a set of recipient accesses, wherein a recipient access in the set of recipient accesses corresponds to a recipient in the set of recipients and wherein each recipient access in the set of recipient accesses describes a likelihood that a corresponding recipient in the set of recipients can access the set of content;

program instructions to determine a set of prediction scores, wherein a prediction score in the set of prediction scores corresponds to a recipient in the set of recipients and wherein each prediction score in the set of prediction scores describes a likelihood that a corresponding recipient in the set of recipients will access the set of content;

program instructions to determine that one or more access requests are required for a subset of the set of recipients to access at least a first content in the set of content based, at least in part, on the set of recipient accesses and the set of prediction scores; and program instructions to submit, prior to sharing the set of content with the set of recipients, the one or more access requests for the subset of the set of recipients to a set of content owners, wherein a content owner in the set of content owners corresponds to a content in the set of content.

14. The computer system of claim 13, further comprising:

program instructions to transmit the set of recipient accesses and the set of prediction scores to a user.

15. The computer system of claim 14, wherein the set of prediction scores is transmitted in a graphical manner.

16. The computer system of claim 13, wherein the set of content exists on a virtual community.

17. The computer system of claim 13, wherein the set of prediction scores is based, at least in part, on a social graph.

* * * * *